United States Patent

Webb et al.

[15] 3,640,473
[45] Feb. 8, 1972

[54] FLAIL-TYPE ROTOR FOR A MATERIAL SPREADER

[72] Inventors: Bryant F. Webb; Bruce D. Schwalm, both of Leola, Pa.

[73] Assignee: Sperry Rand Corporation, New Holland, Pa.

[22] Filed: Apr. 2, 1970

[21] Appl. No.: 24,999

[52] U.S. Cl. ..............................................239/658
[51] Int. Cl. ..............................................A01c 3/06
[58] Field of Search ..........................239/658; 56/29

[56] References Cited

UNITED STATES PATENTS

| | | | |
|---|---|---|---|
| 3,211,461 | 10/1965 | Elwick | 239/658 |
| 2,990,667 | 7/1961 | Schwalm | 56/29 X |
| 3,229,985 | 1/1966 | Yuenger et al. | 239/658 |
| 3,301,566 | 1/1967 | Wood | 239/658 |
| 3,406,914 | 10/1968 | Lepp et al. | 239/658 |

FOREIGN PATENTS OR APPLICATIONS

| | | | |
|---|---|---|---|
| 1,155,262 | 4/1958 | France | 239/658 |

Primary Examiner—M. Henson Wood, Jr.
Assistant Examiner—Edwin D. Grant
Attorney—Joseph A. Brown, John C. Thompson, James J. Kennedy and George C. Bower

[57] ABSTRACT

A flail-type material spreader has a semicylindrical tank for holding material and a rotor shaft extending the length of the tank with flexible flails connected thereto for discharging material on rotation of the shaft. The flails are arranged in groups of two assemblies and the assemblies are connected to the shaft at 90° to one another. Each assembly comprises two bending moments. The flails of one assembly are axially offset to form matching sets of flails along the shaft having bending moments in opposition to minimize the vibration of the rotor shaft.

1 Claims, 3 Drawing Figures

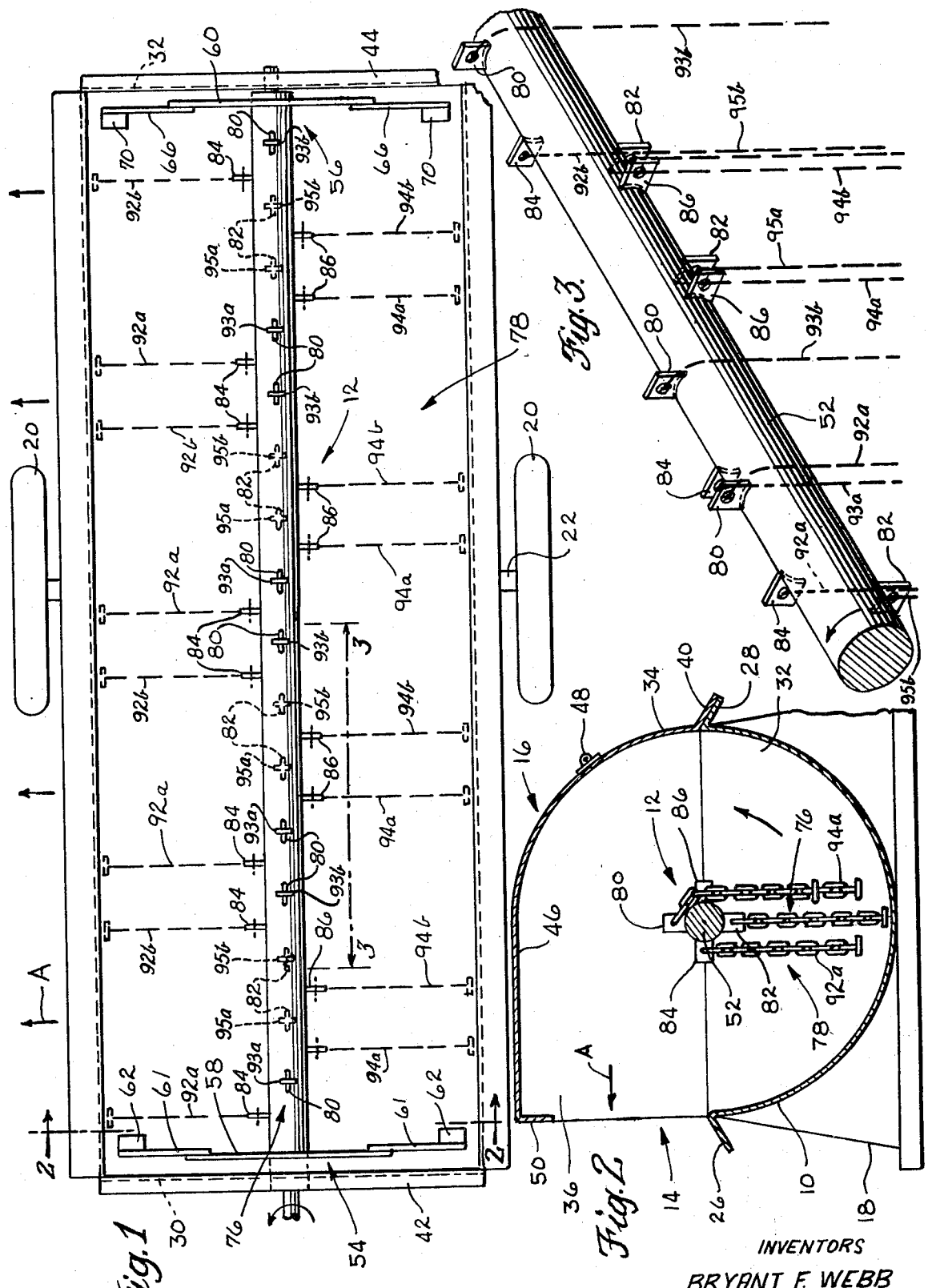

FLAIL-TYPE ROTOR FOR A MATERIAL SPREADER

BACKGROUND OF THE INVENTION

This invention relates to flail-type material spreaders and is directed particularly to the arrangement of the flails to minimize the vibration of the rotor shaft upon which the flails are mounted.

The flail-type material spreaders usually have a semicylindrical tank with a longitudinally extending rotor shaft-carrying flexible flails for discharging material in the tank. A wide range of material may be handled by the spreader. These materials may be dry manure, sticky manure, sloppy manure, liquid manure, wet manure, frozen manure and slurry-type manure. Also different types of bedding may be mixed with the foregoing types of manure. The flail-type material spreader satisfactorily handles all of these various types of material and is therefore very versatile and adaptable to a wide range of conditions on farms.

The tank is mounted on a wheeled frame and usually extends in the direction of travel. The material is discharged by the flails throwing the material through an opening on the side of the spreader. The rotor shaft is connected to the power takeoff of the tractor through a drive (not shown) on the spreader. The shaft is driven over a range of speeds depending upon the discharging action. The flexible flails are usually of the chain type and may be of several different arrangements on the rotor shaft. The simplest is a single row of flails connected along one side of the shaft. In another form two rows of flails are connected on opposite sides of the shaft with the flails of the two rows either aligned or offset. Three rows of flails may be connected to the shaft at 120° intervals. In another form a single arrangement of flails may be spirally connected along the shaft or connected along the outer edge of an auger on the shaft. In some spreaders four rows of flails are connected to the shaft at 90° to one another.

The flails are usually of the chain type and have T-shaped metal flail tips connected on the ends of the chains to assist in the breaking up of solid material. Most flail-type spreaders have a front starter flail and a rear starter flail. These starter flails are impactors pivotally mounted on the outer ends of rotor/arms rigidity secured to the shaft.

The dry, wet or sticky manure is usually loaded into the spreader so that is is piled above the rotor shaft. Since the spreader is not operating the flexible chain flails droop downwardly into the tank and the manure piles around the chains and holds them in this position. On rotation of the shaft the chains wrap around the rotor shaft and form an axial passage through the material without discharging the material from the spreader. The front and rear starter flails due to their construction start the discharge of the material. As the ends of the tank are cleared the chain flails adjacent to the starter flails start to unravel from the shaft and discharge the material from the tank. The material is thus progressively removed from the ends of the tank to the middle. In liquid or slurry-type manures all the flails become operative on rotation of the shaft and assume an extended position to discharge the liquid or slurry manure along the entire length of the spreader.

In previous spreaders the rotor shaft flexes, bends and oscillates as the final remaining manure is unloading. This action severely vibrates the tank and frame of the spreader and may be so severe as to move the spreader and lift the wheels from the ground. This bending and flexing of the shaft also occurs when the spreader is empty and in some types of liquid and slurry manures. The principle objection to this vibration is that the spreader must be subjected to these vibrations in order to clear the spreader of the last of the manure and over a period of time the tank, frame and connections may fatigue and break. For example, the end walls of tanks have cracked and ruptured. These failures will render the spreader useless, thus the vibrations shorten the life of the spreader.

In order to withstand this abuse the spreaders have been made of heavier steel and the connections and supports made stronger. The shaft and flails are the same except they are made heavier to withstand the bending and flexing. The spreaders, however, still severely shake on the final unloading or when running empty but the stronger tank, frame and shaft remain intact and the life of the spreader extended. It is, however, more desirable to eliminate or reduce this action so the spreader is made of less costly and lighter materials, is not subjected to abusive shaking on running empty or on the completion of the unloading and has a longer life without additional expense.

The purpose of this invention is to arrange the flexible flails on the spreader rotor to eliminate excessive bending moments so that vibrations do not occur, or occur only in modest and acceptable amounts.

OBJECTS AND SUMMARY OF THE INVENTION

An object of this invention is to provide a rotor shaft for a flail-type material spreader that on rotation causes none or minimum amount of vibration.

Another object of the invention is to provide a rotor shaft of a flail-type material spreader that has the flails arranged or connected to the shaft so that the shaft does not materially vibrate.

Another object of the invention is to minimize the vibration of a rotor shaft of a flail-type material spreader without the use of counter weights.

In summary, the objects of this invention are accomplished by having the flails that are mounted on the rotor shaft of a flail-type spreader arranged in groups of two assemblies with the flails of the two assemblies in axially alternate positions and with each having matching sets with the bending moments of the matching sets being in opposite relation to prevent the creation of excessive bending moments on the rotor shaft thereby minimizing the vibration of the shaft.

Other and further objects and advantages of the invention will be apparent from the following specification and dependent claims taken in connection with the drawings which illustrate a preferred embodiment of the invention.

BRIEF DESCRIPTION OF THE DRAWINGS

FIG. 1 is a top view of the tank and rotor shaft with the lid and side omitted.

FIG. 2 is a sectional view of the spreader taken along lines 2—2 of FIG. 1 with the lid and side on the tank.

FIG. 3 is a fragmentary prospective view of the rotor shaft.

DETAILED DESCRIPTION OF THE PREFERRED EMBODIMENT

The material spreader has a semicylindrical tank 10 for holding material and a rotor 12 for discharging the material through the side-opening means 14 between top 16 and tank 10 on the right-hand side of the spreader in the direction indicated by the arrows A. The tank is supported by a frame 18, partially shown in FIG. 2, and wheels 20 rotatably mounted on the axle 22 on opposite sides of the tank. The rotor 12 is driven by the power takeoff of the drawing tractor through a drive means (not shown) the front of the tank.

The material holding tank comprises a semicylindrical sheet metal member having side flanges 26 and 28 extending longitudinally along the top edges of the tank. The tank is sealed at the ends by the front tank wall 30 and rear tank wall 32.

In FIG. 2 the top 16 is shown in section and comprises a side 34, a rear panel 36 and a matching front panel (not shown). The side 34 is attached by the flange 40 to the side tank flange 28 and to the front and rear panels. These panels are fastened to the front tank flange 42 and the rear tank flange 44, respectively. A lid 46 is hingedly attached to the side 34 by the hinge 48 and extends over the rotor 12 and tank 10. A downward depending flange 50 extends toward the discharged side flange 26 to form the opening means 14.

The rotor 12 comprises a cylindrical shaft 52 which is rotatably mounted in bearings (not shown) attached to the front tank wall 30 and the rear tank wall 32, respectively. The rotor shaft 52 may be in the order of 7 to 12 feet in length, depending upon the length of the material spreader. At the front and rear ends of the rotor, adjacent to the front wall and rear wall, respectively, are front and rear starter flails 54 and 56, respectively. The starter flails have rotor arms 58 and 60, respectively, rigidly fastened to the rotor shaft 52 extending radially from opposite sides of the shaft. At the ends of the flail 54, impactors 61 are pivotally attached for breaking up material in the spreader and flinging it out of the spreader at the front end. At the outer tips, the impactors 61 have projections 62 extending normal thereto for assisting in this action. At the rear the starting flail 56 has impactors 66 pivotally attached to the rotor 60. The impactors 66, in cooperation with the projection 70 at the tips thereof, break up the material and throw it out through the opening means 14. Thus with more or less solid manure these flails will start the unloading from the front and rear ends.

The rotor shaft has a plurality of groups of two flail assemblies 76 and 78. The flail assembly 76 has two rows of connecting tabs or lugs 80 and 82 on diametrically opposite sides of the shaft 52 and extending radially therefrom with flexible chains 88 and 90, respectively, connected thereto. The assembly 78 has two rows of connecting lugs or tabs 84, 86 on opposite sides of the shaft 52 and extending radially therefrom and are in a plane 90° to the plane of the rows of lugs 80 and 82. The assembly 78 has the flexible chain flails 92a, 94a connected to the lugs 84, 86, respectively. On rotation of the shaft the flails extend outwardly generally in the dash positions as indicated in FIG. 1. The flails will assume these positions when the spreader is operated empty or unloading liquid or slurry-type manure. When in these positions the flails create centrifugal forces on the shaft 52 which develop bending moments on the shaft.

Considering assembly 78 (shown in a horizontal position in FIG. 1) the flails 92a, b and 94a, b and the lugs 84 and 86 are arranged to reduce the affect of these bending moments to a minimum. The flail 92a is axially offset from the flail 94a which forms a set, the flail 92b is offset, in the opposite direction, from the flail 94b which forms a matching set. The set formed by the flails 92a and 94a creates a moment which is opposite in relation to the moment created by the set formed by the flails 92b and 94b. These two moments will cancel or substantially cancel one another and thus substantially eliminating the bending moments on the rotor tube formed by the flails 92a, 92b and 94a, 94b. As seen from FIG. 1 the other flails have a corresponding relationship.

The assembly 76 of the flails has two flails 93a, 93b connected on one side of the shaft and the two other flails 95a, 95b connected on the opposite side of the shaft. The flails 94 are axially offset to the flails 95a, 95b. Matching sets of flails 93a, 95b and 93b, 95a are formed. One set comprises flails connected on opposite sides of the shaft and axially offset in one direction and the matching set comprises flails on opposite sides of the shaft axially offset in the opposite direction. The flails are connected so that the matching sets of the flails are within sections or segments of the shaft. The bending moments of the matching sets are in opposition within a sector or segment and, therefore, do not accumulate over the length of the shaft and cause the shaft to bend and flex thereby avoiding the objectionable oscillations and vibrations. The axial distance between the flails of one pair is equal to the axial distance between the opposed flails of a set. Thus the axial distance between 92a and 92b is the same as the axial distance between 94b and 94a.

The assembly 76 is 90° to the assembly 78 and the lugs 80 and 82 are positioned 90° from the lugs 84 and 86 and are intermediate these lugs to prevent the flexible flails from interferring. The lugs 80 and 82 have the same arrangement as the lugs 84, 86 so that the bending moments created by the various matching sets of flails are in opposed relation and cancel or substantially cancel one another. In a given group, the assembly 78 may be considered the first assembly and the assembly 76, the second assembly. The flails 92a and 92b may be considered the first and second flails which are a given distance apart and the flails 94a and 94b may be considered the third and fourth flails which are spaced apart a distance less the given distance. The second assembly 76 has the flails 93a and 93b as the fifth and sixth flails which are the given distance apart and has the flails 95a and 95b as the seventh and eighth flails which are less than the given distance apart. The flails are connected to the shaft to axially alternate the flails of the two assemblies.

It is thus seen that within a number of short sectors of the long rotor shaft the bending moments created by the flails are nullified and the bending moments of the flails are not permitted to accumulate or become additive along the length of the shaft. The shaft does not vibrate, bend or oscillate thereby impart vibrations to the spreader that causes it to become unstable or the spreader to fatigue and fail. This stabilization is done by the arrangement of the operative units of the material spreader and without the addition of any complex or heavy counterweight systems which would add to the cost of the spreader. Further there has been no need to modify the tank or the front starter flail or the rear starter flail.

The tank can be made of lighter weight and less costly parts so that the spreader is less expensive to manufacture. The arrangement of the attachment of the flails to the shaft assures aggressive action in solid, semiliquid and liquid material for faster unloading and even distribution of the discharged material on the field. Further, the forward rows of flails means that one row of flails is always in contact with the load resulting in a smoother operation of the spreader. The invention has provided a lighter, less costly spreader that operates smoothly while unloading and is not subjected to severe fatiguing vibration at the end of the unloading or when the spreader is operating empty.

While this invention has been described in connection with a single embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described our invention, what we claim is:

1. In a flail-type manure spreader having a material holding tank with opening means and a shaft extending longitudinally to said opening means and rotatably mounted in said tank, said shaft having a plurality of groups of flails positioned axially therealong and a group of flails having first and second assemblies of flails with the first assembly at 90° to the second assembly, said first assembly having first and second flails axially spaced a given distance apart on the same side of said shaft and third and fourth flails on the opposite side of said shaft and spaced apart less than the given distance to create substantially balancing movements on centrifugal extension of said flails, said second assembly having fifth and sixth flails axially spaced the given distance apart on the side 90° from the side of the first and second flails and seventh and eighth flails on the opposite sides of said shaft therefrom and spaced apart less than the given distance to create substantially balancing movements on centrifugal extension of said flails, said first and second assemblies axially offset less than the axially distance between said first and third flails to axially alternate the flails of said first and second assemblies so that on rotation of said shaft said flails of said first and second assemblies alternately subscribe paths through said tank for a substantially balanced rotation of said shaft.

* * * * *